US012755243B2

(12) United States Patent
Sieksmeier et al.

(10) Patent No.: US 12,755,243 B2
(45) Date of Patent: Oct. 6, 2026

(54) CONVEYING METHOD AND CONVEYING APPARATUS FOR GOODS OF MULTIPLE ORDERS

(71) Applicant: Dürkopp Fördertechnik GmbH, Bielefeld (DE)

(72) Inventors: Dirk Sieksmeier, Spenge (DE); Markus Merten, Bielefeld (DE); Dirk Meier, Detmold (DE); Axel Kleinekathöfer, Bielefeld (DE); Pascal Rehm, Bielefeld (DE)

(73) Assignee: Dürkopp Fördertechnik GmbH, Bielefeld (DE)

( * ) Notice: Subject to any disclaimer, the term of this patent is extended or adjusted under 35 U.S.C. 154(b) by 593 days.

(21) Appl. No.: 18/322,451

(22) Filed: May 23, 2023

(65) Prior Publication Data

US 2023/0385766 A1 Nov. 30, 2023

(30) Foreign Application Priority Data

May 24, 2022 (DE) ..................... 10 2022 205 210.2

(51) Int. Cl.
*G06Q 10/0875* (2023.01)
*B07C 5/36* (2006.01)
(Continued)

(52) U.S. Cl.
CPC ........... *G06Q 10/0875* (2013.01); *B07C 5/36* (2013.01); *B65G 1/1373* (2013.01); (Continued)

(58) Field of Classification Search
CPC .... G06Q 10/0875; B07C 5/36; B65G 1/1373; B65G 15/10; B65G 1/0457; B65G 1/1378; B65G 17/12; B65G 17/002
See application file for complete search history.

(56) References Cited

U.S. PATENT DOCUMENTS 2,643,761 A 6/1953 Wagner et al.
3,357,539 A 12/1967 Naslund
(Continued)

FOREIGN PATENT DOCUMENTS

AT 404717 B 2/1999
CH 714004 A1 1/2019
(Continued)

OTHER PUBLICATIONS

German Patent Office Examination Report for Application No. 102022205210.2 dated Dec. 13, 2022 (7 pages including statement of relevance).

(Continued)

*Primary Examiner* — Thomas Randazzo
(74) *Attorney, Agent, or Firm* — Michael Best & Friedrich LLP

(57) ABSTRACT

A conveying method for goods comprising the method steps of providing goods for multiple orders, wherein the goods are conveyed in conveyor containers in an endless conveyor along a goods conveying direction, detecting the goods provided in the endless conveyor, forming a list of complete orders on the basis of the goods provided in the endless conveyor, defining ordered goods as goods included in at least one of the complete orders, automatically evaluating the complete orders with regard to their suitability for allocation to one of multiple goods sinks, taking into account at least one characteristic of the ordered goods and/or the goods sinks, wherein the goods sinks are connected to the endless conveyor in terms of conveying technology, allocating a complete order to one of the goods sinks in dependence on the evaluation, and conveying the allocated ordered goods to the goods sink.

31 Claims, 3 Drawing Sheets

(51) Int. Cl.

| | |
|---|---|
| ***B65G 1/04*** | (2006.01) |
| ***B65G 1/137*** | (2006.01) |
| ***B65G 15/10*** | (2006.01) |
| ***B65G 17/00*** | (2006.01) |
| ***B65G 17/12*** | (2006.01) |

(52) U.S. Cl.

CPC ........... *B65G 1/1378* (2013.01); *B65G 15/10* (2013.01); *B65G 17/002* (2013.01); *B65G 17/12* (2013.01); *B65G 1/0457* (2013.01)

(56) References Cited

U.S. PATENT DOCUMENTS

| | | | | |
|---|---|---|---|---|
| 4,244,672 | A | 1/1981 | Lund | |
| 6,595,346 | B1 | 7/2003 | Advani et al. | |
| 6,701,001 | B1 | 3/2004 | Kenneway et al. | |
| 6,762,382 | B1 * | 7/2004 | Danelski | B65G 17/002 209/912 |
| 8,335,585 | B2 | 12/2012 | Hansl et al. | |
| 8,776,694 | B2 * | 7/2014 | Rosenwinkel | B65G 17/345 104/88.02 |
| 11,780,686 | B2 * | 10/2023 | Eisinger | B65G 47/967 198/370.04 |
| 12,466,668 | B2 * | 11/2025 | Van Haaster | B65G 47/96 |
| 2010/0213031 | A1 | 8/2010 | Krech et al. | |
| 2014/0166553 | A1 | 6/2014 | Enenkel | |
| 2014/0303770 | A1 * | 10/2014 | Wend | B65G 1/1376 700/215 |
| 2015/0175358 | A1 | 6/2015 | Otto | |
| 2017/0369248 | A1 | 12/2017 | Fenile | |
| 2018/0085788 | A1 | 3/2018 | Engel et al. | |
| 2018/0154399 | A1 | 6/2018 | Wagner et al. | |
| 2018/0333749 | A1 | 11/2018 | Wagner et al. | |
| 2019/0071219 | A1 | 3/2019 | Ueda et al. | |
| 2019/0375527 | A1 * | 12/2019 | Voelker | B65B 35/44 |
| 2020/0216262 | A1 | 7/2020 | Sigrist | |
| 2020/0251366 | A1 | 8/2020 | Wada | |
| 2021/0114813 | A1 * | 4/2021 | Lindley | B65G 1/1376 |
| 2021/0176433 | A1 | 6/2021 | Durtsch | |
| 2021/0206581 | A1 * | 7/2021 | Ueda | B65G 43/08 |
| 2021/0331873 | A1 * | 10/2021 | Vegh | B65G 43/10 |
| 2023/0139511 | A1 * | 5/2023 | Süss | B65G 47/38 |
| 2023/0382648 | A1 | 11/2023 | Völker et al. | |
| 2023/0382652 | A1 | 11/2023 | Sieksmeier et al. | |
| 2023/0385766 | A1 | 11/2023 | Sieksmeier et al. | |
| 2024/0417194 | A1 | 12/2024 | Rehm et al. | |
| 2025/0122021 | A1 | 4/2025 | Rehm et al. | |

FOREIGN PATENT DOCUMENTS

| | | | |
|---|---|---|---|
| CN | 115667098 | A | 1/2023 |
| DE | 1237020 | B | 3/1967 |
| DE | 1285404 | A | 12/1968 |
| DE | 3929301 | A1 | 3/1991 |
| DE | 102005006455 | A1 | 8/2006 |
| DE | 102009011230 | A1 | 9/2010 |
| DE | 102010010107 | A1 | 9/2011 |
| DE | 102011104511 | B3 | 10/2012 |
| DE | 102011103194 | A1 | 12/2012 |
| DE | 102011116086 | A1 | 4/2013 |
| DE | 102014115579 | A1 | 4/2016 |
| DE | 102016105716 | A1 | 10/2017 |
| DE | 102018201675 | A1 | 8/2019 |
| DE | 102018201676 | A1 | 8/2019 |
| DE | 102018114026 | A1 | 12/2019 |
| DE | 102018221043 | A1 | 6/2020 |
| DE | 102019205980 | A1 | 10/2020 |
| DE | 102020214613 | A1 | 12/2021 |
| DE | 102021207911 | A1 | 1/2023 |
| DE | 102021132413 | B3 | 5/2023 |
| EP | 1690811 | A1 | 8/2006 |
| EP | 2130968 | A | 12/2009 |
| EP | 2301867 | A2 | 3/2011 |
| EP | 2418160 | A1 | 2/2012 |
| EP | 2620394 | A1 | 7/2013 |
| EP | 2709935 | B1 | 4/2015 |
| EP | 2885231 | B1 | 11/2019 |
| EP | 3666690 | | 6/2020 |
| EP | 3818001 | B1 | 9/2022 |
| EP | 4115994 | A1 | 1/2023 |
| EP | 4122849 | A1 | 1/2023 |
| KR | 102330956 | B1 | 11/2021 |
| WO | 2008135371 | A1 | 11/2008 |
| WO | 2018200503 | A1 | 11/2018 |
| WO | 2019016120 | A1 | 1/2019 |
| WO | 2020004919 | A1 | 1/2020 |
| WO | 2023095049 | A1 | 6/2023 |
| WO | 2023194249 | A2 | 10/2023 |

OTHER PUBLICATIONS

European Search Report for Application No. 23172298.4 dated Oct. 10, 2023 (16 pages).

European Search Report for Application No. 23172301.6 dated Oct. 10, 2023 (9 pages).

Extended European Search Report and English translation for Application No. 23172299.2 dated Oct. 10, 2023 (8 pages).

German statement of Patent relevance Office Action for Application No. 102022205209.9 dated Dec. 13, 2022 (6 pages including statement of relevance).

Zhou Binghai et al: "A material handling scheduling method for mixedmodel automotive assembly lines based on an improved static kitting strategy", Computers & Industrial Engineering, Pergamon, Amsterdam, NL, vol. 140, Jan. 7, 2020, XP086001622, DOI: 10.1016/J.CIE.2020.106268.

* cited by examiner

CONVEYING METHOD AND CONVEYING APPARATUS FOR GOODS OF MULTIPLE ORDERS

CROSS-REFERENCES TO RELATED APPLICATIONS

This application claims priority to German Patent Application No. DE 10 2022 205 210.2, filed May 24, 2022, the content of which is incorporated herein by reference in its entirety as if fully set forth herein.

FIELD OF THE INVENTION

The invention relates to a conveying method and a conveying apparatus for goods of multiple orders.

BACKGROUND OF THE INVENTION

In a conveying apparatus, goods of multiple orders can be conveyed to at least one goods sink, in particular a packing place, from an endless conveyor. The endless conveyor has a circulation time within which a product passes a point in the endless conveyor twice. Goods that form an order are allocated to exactly one goods sink and are referred to as ordered goods.

When goods are randomly distributed in the endless conveyor, there is a staging time that defines the duration between the request for goods at the goods sink and the arrival of the last ordered goods at the goods sink. The larger the order, i.e., the more goods the order comprises, the greater the average staging time. The staging time influences the goods throughput at the goods sink, i.e., its logistic capacity. For an order containing only one product, the average staging time is 50% of the circulation time. As the number of goods per order increases, the staging time approaches the circulation time. A long staging time affects the logistic conveying capacity of the goods sink and can lead to a reduced overall efficiency of the conveying apparatus.

SUMMARY OF THE INVENTION

It is an object of the present invention to reduce the average staging time of orders containing multiple goods.

This object is achieved according to the invention by a conveying method for goods, comprising the method steps of providing goods for multiple orders, wherein the goods are conveyed in an endless conveyor along a goods conveying direction, detecting the goods provided in the endless conveyor, forming a list of complete orders on the basis of the goods provided in the endless conveyor, defining ordered goods as goods included in at least one of the complete orders, automated evaluation of the complete orders with regard to their suitability for allocation to one of multiple goods sinks, taking into account at least one characteristic of the ordered goods and/or of the goods sinks, wherein the goods sinks are connected to the endless conveyor in terms of conveying technology, allocating a complete order to one of the goods sinks depending on the evaluation and conveying the allocated ordered goods to the goods sink, as well as by a conveying apparatus for goods of multiple orders comprising a closed endless conveyor by means of which the goods are conveyed in endless circulation, a plurality of goods sinks which are coupled to the endless conveyor in terms of conveying technology and to which the goods are conveyed as ordered goods, a control unit which is designed to carry out the conveying method.

Goods in an endless conveyor are allocated to at least one order and defined as ordered goods, wherein complete orders are evaluated in an automated manner with regard to their suitability for allocation to one of multiple goods sinks. In terms of conveying technology, the goods sinks are connected to the endless conveyor, in particular directly. In particular, the respective position of a goods sink with respect to the endless conveyor, in particular in the endless conveyor, is known a priori. The orders are evaluated taking into account at least one characteristic of the ordered goods and/or the goods sinks. In particular, multiple complete orders exist in the endless conveyor. In particular, at least one complete order is compatible with a plurality of goods sinks. The at least one complete order is suitable to be conveyed to several goods sinks. In dependence on the evaluation, the at least one complete order is logically allocated, i.e., assigned, to one of the goods sinks and the ordered goods of the complete order are conveyed to the goods sink. A goods sink is considered to be occupied in particular if a complete order is assigned to this goods sink and in particular also if the ordered goods have not or only partially been conveyed to the goods sink. No orders can be assigned to an occupied goods sink nor can their goods be conveyed to it.

According to the invention, the average staging time of the complete orders can be reduced. This can increase the throughput of goods, in particular at the goods sinks. The amount of goods that can be processed at the goods sinks is increased. The efficiency of the facility, in particular the throughput, is increased. A larger quantity of goods can be processed with the same number of goods sinks. When processing a constant quantity of goods, the number of goods sinks in the conveying apparatus can be reduced. This reduces the investment costs and the operating costs. The space required for this conveying apparatus is reduced.

In particular, the orders each comprise multiple goods, although orders with only one single product are also possible. The goods are conveyed in particular in conveyor containers along a goods conveying direction. In particular, exactly one product is conveyed per conveyor container.

A conveyor container is in particular a conveyor bag, which is in particular transported in a suspended manner in the conveying apparatus. The conveying apparatus is in particular an overhead conveyor. A conveyor bag of this type is known, for example, from DE 10 2018 201 675 A1 or from DE 10 2018 201 676 A1. Alternatively, the conveying apparatus can be a horizontal conveyer and in particular the conveyor container can be a container for lying goods, in particular a crate or a cardboard box. In this case, the conveying apparatus is a horizontal conveyor, in particular a belt conveyor or band conveyor, in particular a tilt tray sorter, also referred to as a split tray sorter and/or a cross belt conveyor, also referred to as a cross belt conveyor. In particular, the conveyor container is the packaging of the goods, especially a shipping cardboard box and/or a shipping bag.

The endless conveyor itself has a buffer function and, in particular, enables flexible allocation of the goods in the endless conveyor to the goods sinks. Since the endless conveyor is directly connected to a plurality of goods sinks, a rigid allocation of goods to exactly one goods sink is dispensable. The method can be implemented flexibly.

The method according to the invention is particularly suitable for orderless quantity distribution and/or order-based distribution, which is used for e-commerce orders, for example. In order-based distribution, a quantity of goods that constitutes an order is allocated to a goods sink instead of individual goods. An order comprises at least one product and in particular a number of goods, wherein the goods are in particular different goods, i.e., different types of goods. In particular, the goods sinks each have a plurality of goods locations. Each goods location constitutes a buffer for at least one ordered product and in particular for at least one order consisting of at least one ordered product and in particular of multiple ordered goods.

A conveying method in which the at least one characteristic of the ordered goods and the goods sinks is a respective distance of the ordered goods from the goods sinks which is oriented in the goods conveying direction enables the average staging time to be optimized. It has been recognized that the distance of the goods to the respective goods sink is decisive for the determination of the staging time. In particular, the respective distance of an ordered goods to a goods sink is a snapshot. The distance of the ordered goods to the goods sinks is in particular a function of time, in particular in the case that the ordered goods are continuously circulated in the endless conveyor. In particular, the determination of the distance and the resulting evaluation of the suitability of the orders is repeated.

A method in which the smaller the distance of the ordered goods that are furthest away from the respective goods sink, the higher the evaluation of a complete order in the endless conveyor, takes into account the staging time for the different orders to the different goods sinks, wherein the respective staging time results from the respective distance of the ordered goods of an order that is located furthest away from the respective goods sink. The shorter this distance, the higher the value of the order. In this case, the staging time is short.

A method in which the positions of the ordered goods are determined, in particular repeatedly, in particular cyclically, and transmitted in particular to a logistic control system, ensures a regular update of the snapshot when evaluating the suitability of the orders. This ensures that, for example, new goods in the endless conveyor enable a new allocation of goods to orders and/or new order lists can be formed. A cycle time for the in particular cyclical position determination of the ordered goods is in particular no more than 10 s, in particular no more than 5 s and in particular no more than 1 s. The shorter the cycle time, the more updated the evaluation can be.

A conveying method in which the position of an ordered product is determined from a relative conveying position of a conveying drive means, which is determined in particular by means of a sensor, and from a fixed entrainment position of an entrainer that is conveyed by the conveying drive means, wherein the fixed entrainment position is determined in particular when the ordered product is introduced into the endless conveyor, in particular by means of a reading unit that cooperates with a signal transmitter that is attached to and/or integrated in the entrainer, enables an uncomplicated and direct determination of the position of the ordered goods. In particular, the endless conveyor has a fixed conveyor container entrainment which is implemented by means of a conveyor drive means, in particular a drive chain that is driven by a drive motor. A fixed entrainment position can be defined in dependence on a relative conveying position of the conveyor drive means and a fixed entrainment position of an entrainer conveyed by the conveyor drive means, a so-called roller adapter. The relative conveying position is in particular a rotational position of the drive motor, which can be determined by means of a suitable sensor, in particular a rotary encoder. The fixed entrainment position can be determined when the entrainer is introduced into the endless conveyor. In particular, a signal transmitter attached to and/or integrated in the entrainer, in particular in the form of an identification means such as an RFID chip, is used for this purpose. The goods conveyed in the conveyor containers can be clearly identified. For this purpose, the conveyor containers have identification means known per se, in particular RFID chips and/or machine-readable codes, in particular bar codes or QR codes. Reading devices are arranged along a goods conveying direction of the conveying apparatus, which serve to read the identification means. The conveyor containers with the goods conveyed therein can be tracked in the conveying apparatus. In particular, the position of each conveyor container within the conveying apparatus can be determined.

A conveying method in which the at least one characteristic of the ordered goods and/or the goods sinks is the availability of the goods sink, the prioritization of goods sinks, in particular the prioritization of discharge compartments of a goods sink, the compatibility of the ordered goods with the goods sinks, the prioritization of orders, in particular the prioritization of ordered goods within orders, a setup criterion, the reduction of unprocessed orders in the endless conveyor and/or the reduction of unused ordered goods in the endless conveyor, enables further criteria to be considered when evaluating the suitability of ordered goods for the allocation to a goods sink. For the availability of a goods sink, for example, a point in time of the last allocation of ordered goods and/or the current filling level of the goods sink with ordered goods can be taken into account. As a result, it can be avoided that ordered goods accumulate in front of a goods sink until this goods sink is available. The set-up criterion for a goods sink is to be understood as the fact that a goods sink is exclusively permitted for the handling of certain goods, in particular a certain maximum volume and/or maximum external dimensions as well as a certain maximum weight, in particular due to constructional and/or structural conditions.

A method in which the orders are evaluated on the basis of a transport matrix, wherein the transport matrix comprises columns and rows, wherein in particular the rows symbolize the different orders and the columns symbolize the different goods sinks, simplifies the automated, in particular computer-assisted, evaluation of the orders.

A conveying method in which a numerical value, in particular ordinally or metrically scaled, is assigned to each order during the evaluation, wherein in particular a separate identification number is assigned to an order if this order is unsuitable for the respective goods sink, enables the consideration of unsuitable goods sinks for the automated evaluation of orders. In particular, a separate identification number is used for this purpose, which differs in particular from numerical values that are used as a basis for evaluating individual orders. Such numerical values are in particular ordinally or metrically scaled. The said identification number differs from these numerical values in particular in that the identification number has the value “zero” or is a negative number.

A conveying method comprising transforming the transport matrix into a cost matrix, in particular by multiplying individual evaluations of each order and/or by multiplying individual costs and/or applying the Kuhn-Munkres algorithm, simplifies the determination of an overall optimum for the processing of multiple orders.

A conveying method comprising an automated and in particular fully automated execution of the method, in particular by means of a machine control system for the endless conveyor and/or by means of a logistic control system for a position definition of the goods sinks, improves the preconditions for automated and, in particular, computer-implemented execution.

A conveying method in which the ordered goods are delivered to the goods sinks, in particular by unloading, in particular automatically, the ordered goods from conveyor containers by means of an unloading unit and/or by discharging the conveyor containers that convey the ordered goods at the assigned goods sink by means of a discharge unit, simplifies the discharge of the ordered goods to the goods sinks.

A conveying apparatus for goods of multiple orders comprising a closed endless conveyor by means of which the goods are conveyed in endless circulation, a plurality of goods sinks which are coupled to the endless conveyor in terms of conveying technology and to which the goods are conveyed as ordered goods, a control unit which is designed to carry out the conveying method has substantially the advantages of the conveying method, to which reference is hereby made. In particular, each goods sink may be configured such that it can receive one or more goods. In particular, the goods sinks are designed as packing places. At the packing places, the ordered goods are discharged from the endless conveyor and each packed into an order, in particular loaded into a shipping container, and the shipping container is closed. A shipping container can be a box, a cardboard box or a bag. At the packing places, the goods of an order are prepared for dispatch and, in particular, conveyed on to an outgoing goods zone of the conveying apparatus as a fully packed order.

A conveying apparatus configured such that the endless conveyor has a first conveyor strand with a fixed conveyor container entrainment, wherein the first conveyor strand is connected to the goods sinks, in particular directly, and/or wherein the first conveyor strand has a conveyor drive means for the fixed conveyor container entrainment, in particular a drive chain which runs in a conveyor rail, and entrainers which cooperate therewith and which can be coupled in each case to a conveyor container, enables an improved, circulating conveyance of the goods in the endless conveyor.

It is advantageous if the endless conveyor has a first conveyor strand and a second conveyor strand, wherein only the first conveyor strand has a fixed conveyor container entrainment. The second conveyor strand does not have a fixed conveyor container entrainment. The second conveyor strand has a buffer function. The second conveyor strand in particular serves to recirculate the goods and in particular as a bypass section in the endless conveyor with respect to the first conveyor strand. In particular, the closed endless conveyor is formed by the first conveyor strand and the second conveyor strand. In this case, the endless conveyor does not have any other conveyor strands.

It is also possible for the endless conveyor to have more than two conveyor strands, wherein there may be a plurality of first conveyor strands, i.e., with fixed conveyor container entrainment, and/or a plurality of second conveyor strands without fixed conveyor container entrainment. It is essential that only the first conveyor strands are designed with a fixed conveyor container entrainment. Accordingly, however, more than one conveyor strand, namely a plurality of first conveyor strands, can each have a fixed conveyor container entrainment.

It has been found that with the endless conveyor, and in particular with the second conveyor strand without fixed conveyor container entrainment, it is possible to decouple the conveyor containers and the conveyor container entrainment. This makes it possible, in particular, to engage the conveyor containers in the flow of goods of the endless conveyor at an adjustable distance, i.e., in terms of conveying technology, to feed them into the endless conveyor. Gaps in the, in particular recirculated, flow of goods, which arise in particular due to the discharge of goods to the goods sinks, can be closed by at least temporarily accumulating the goods in the second conveyor strand and/or by selectively engaging the goods from the at least one goods source. It is possible to post-compact the flow of goods.

The conveyor container and a conveyor drive which drives the conveyor containers in the endless conveyor can be decoupled at least in sections and/or at least temporarily, i.e., are not firmly connected to one another. This decoupling takes place along the second conveyor strand.

The endless conveyor itself has a buffer function and, in particular, enables flexible allocation of the goods in the endless conveyor to the goods sinks. Since the endless conveyor is directly connected to multiple goods sinks, a rigid allocation of goods to exactly one goods sink is dispensable. The method can be implemented flexibly.

The conveyor container entrainment is implemented in particular by means of a conveyor rail known per se and a drive chain running therein, which cooperates with entrainers. The entrainers are in particular designed as so-called roller adapters which can be conveyed in a guided manner in the conveyor rail. With regard to the design and function of such roller adapters, reference is expressly made to DE 10 2005 006 455 A1. The roller adapters enable the conveyor container to be coupled to the conveyor drive means, i.e., the drive chain.

Alternatively, the first conveyor strand can be designed as a band conveyor or belt conveyor, which is driven by way of a conveyor drive means that is known per se. The band conveyor or belt conveyor is used to transport containers for horizontal conveyance. On the band conveyor, the goods can be conveyed immediately, i.e., directly, or indirectly in transport boxes.

A conveying apparatus configured such that the endless conveyor has a second conveyor strand without fixed conveyor container entrainment, wherein the second conveyor strand together with the first conveyor strand forms the closed endless conveyor, enables an improved buffer function of the endless conveyor. In particular, the flow of goods can be consolidated and in particular post-compacted. In particular, the second conveyor strand makes it possible to decouple the goods from the fixed conveyor container entrainment.

The second conveyor strand can be designed as a gravity conveyor in a particularly advantageous and uncomplicated manner. As a gravity conveyor, the second conveyor strand is arranged at an angle of inclination relative to the horizontal, wherein the inclination corresponds to the circulating direction of conveyance of the goods. The angle of inclination is in particular no more than 15°, in particular no more than 10°, in particular no more than 8°, in particular no more than 5°, in particular no more than 3° and in particular at least 1°. With the gravity conveyor, the goods are automatically conveyed along the second conveyor strand by gravity. In addition or as an alternative to gravity conveyance, a separate conveyor drive for machine-assisted conveyance can be provided on the second conveyor strand.

If the conveying apparatus is an overhead conveying system, the accumulation conveyor can in particular also be designed as a power-and-free conveyor, i.e., in particular as a two-rail system with an upper rail in which a drive chain runs and a lower rail in which the entrainers, i.e., roller adapters, run. In this case, the roller adapters are positively coupled to the drive chain and can be disengaged as required so that the drive chain can circulate continuously and the individual roller adapters can still be stopped and/or discharged. Such a conveyor is also called an overhead twin rail chain conveyor.

If the conveying apparatus is a horizontal conveyor, the second conveyor strand may in particular be designed as a downwardly inclined ramp and/or runway. Additionally or alternatively, a driven conveyor belt may be provided.

At least one goods source which provides the goods in the conveyor containers ensures the reliable and flexible provision of goods for the endless conveyor.

Both the features indicated above and the features indicated in the following embodiment example of a conveying apparatus according to the invention are each suitable, alone or in combination with one another, for further refining the subject-matter according to the invention. The respective combinations of features do not constitute any restriction with regard to the further embodiments of the subject-matter of the invention, but are essentially merely exemplary in character.

Further features, advantages and details of the invention will be apparent from the following description of an embodiment example with reference to the drawing.

DETAILED DESCRIPTION

Figure 1:
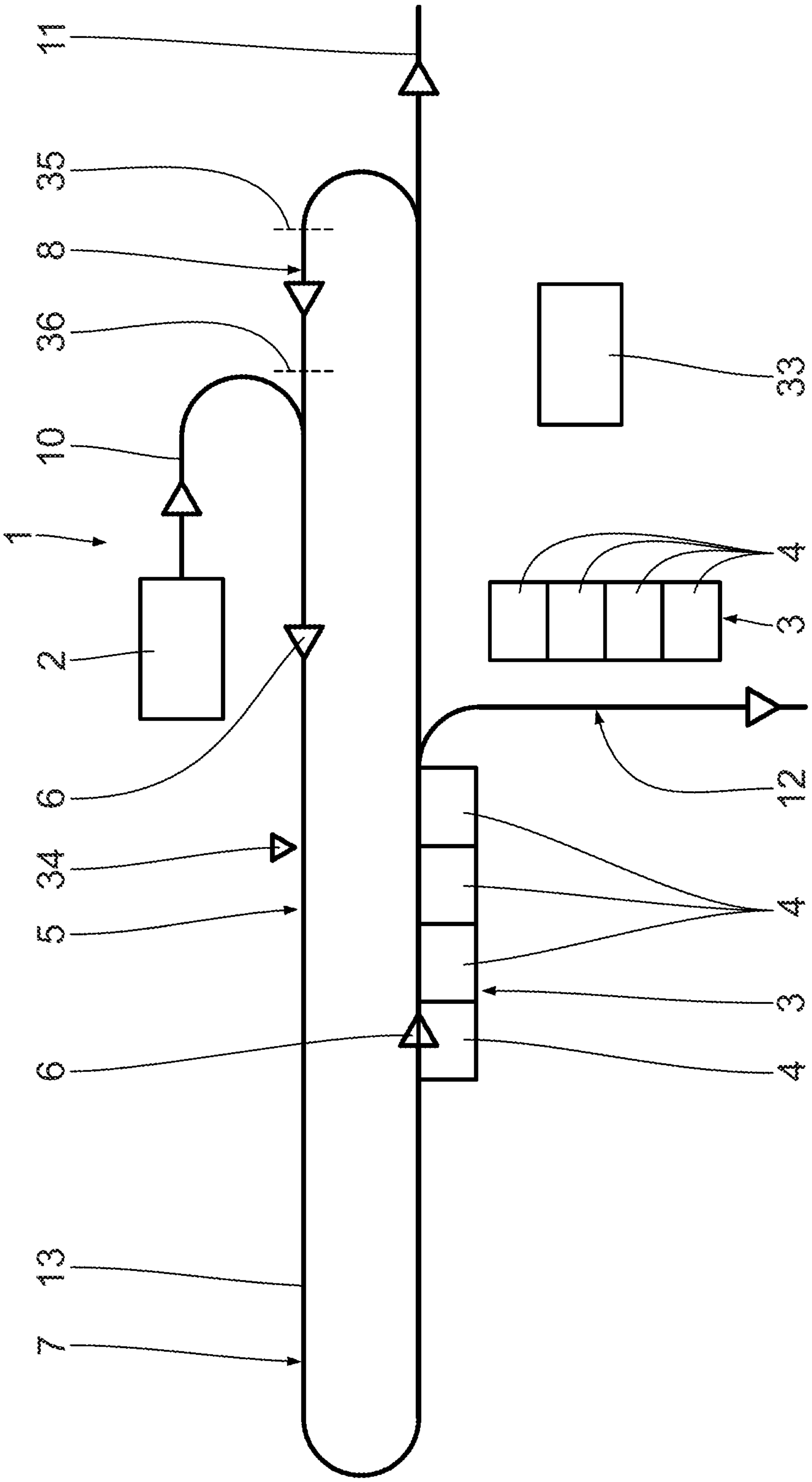
FIG. 1 shows a schematic illustration of a conveying apparatus according to the invention.

A conveying apparatus 1 which is shown purely schematically in FIG. 1 serves to convey goods from at least one goods source 2 to a plurality of goods sinks 3. The conveying apparatus can comprise a plurality of goods sources 2 which are arranged in particular parallel to one another. Each goods sink 3 has in particular a plurality of goods discharge points 4 which are in particular mechanically separated from one another, in particular in the form of partition walls. The goods discharge points 4 at a goods sink 3 can also be designed as separate throw-in shafts having a funnel-shaped goods receptacle which opens upwards in particular.

The goods sinks 3 are in particular packing places at which goods of an order can be packed and in particular handed over to an outgoing goods zone of the conveying apparatus 1 for dispatch.

The goods source 2 and the goods sinks 3 are connected in terms of conveying technology by means of an endless conveyor 5. The endless conveyor 5 has an endlessly circulating conveyor line and enables goods to be conveyed along the goods conveying direction 6, which is symbolized by an arrow in FIG. 1 and is oriented in the counterclockwise direction.

The endless conveyor 5 has a first conveyor strand 7 and a second conveyor strand 8. At the goods source 2, the goods are provided in conveyor containers and conveyed to the goods sinks 3 by means of the conveyor containers. The goods sinks 3 are in particular directly connected to the at least one goods source 2 via the first conveyor strand 7. In particular, exactly one product is arranged in each conveyor container.

The first conveyor strand 7 has a conveyor drive means, not shown in more detail, which enables a fixed conveyor container to be entrained. The conveyor drive means comprises in particular a drive motor and a drive chain that is mechanically coupled thereto. The drive chain is in particular arranged to be guided within a conveyor rail 13 of the first conveyor strand 7, in particular within a guide profile which is in particular made of plastic.

The first conveyor strand 7 and the second conveyor strand 8 are coupled to each other in terms of conveying technology at two transfer points 35, 36. The first transfer point 35 is arranged in the goods conveying direction 6 between the end of the first conveyor strand 7 and the beginning of the second conveyor strand 8. At the first transfer point 35, the conveyor containers are transferred from the fixed conveyor container entrainment in the first conveyor strand 7 to the second conveyor strand 8 without fixed conveyor container entrainment. At the second transfer point 36, which is arranged in the goods conveying direction 6 between the end of the second conveyor strand 8 and the beginning of the first conveyor strand 7, the goods are transferred from the second conveyor strand 8 to the fixed conveyor container entrainment in the first conveyor strand 7.

The goods source 2 is coupled to the endless conveyor 5 in terms of conveying technology via at least one feed conveyor strand 10, in particular downstream of the second conveyor strand 8 and in particular downstream of the conveyor drive means.

The second conveyor strand 8 is designed in particular as an accumulation conveyor and in particular as a gravity conveyor. It is particularly uncomplicated to design it as a gravity conveyor, which is in particular inclined downwards with respect to the horizontal. The inclination is in particular directed towards the first conveyor strand 7, in particular towards the conveyor drive means. The second conveyor strand 8 has a buffer function.

The conveying apparatus 1 comprises a plurality of goods sinks 3, in particular of different design. The goods sinks 3 can also be of identical design. The goods sinks 3 are spaced apart along the goods conveying direction 6, i.e., one behind the other. A first goods sink 3, shown on the left in FIG. 1, comprises an unloading unit, not shown in more detail, which enables the goods to be unloaded from the conveyor containers, in particular automatically. The first goods sink 3, and in particular the discharge compartments 4, are arranged spatially adjacent to the first conveyor strand 7. The automatic unloading unit can, for example, enable automatic opening or tilting of conveyor bags and/or automatic swivelling or tilting of horizontal conveyor containers, wherein the discharge compartments of the first goods sinks 3 are arranged in the discharge direction of the goods. The first goods sink 3 is thus arranged directly adjacent to the first conveyor strand 7.

Downstream of the goods sinks 3, a discharge line 11 is connected to the endless conveyor 5. The discharge line 11 serves to discharge, in particular automatically, emptied conveyor containers from the endless conveyor 5. The discharge line 11 leads in particular to a loading station that is not shown, at which the conveyor containers can be loaded with goods. The discharge line 11 can in particular also be connected to a buffer storage unit in order to temporarily store empty conveyor containers.

The discharge line 11 can be omitted, in particular if automatic emptying of the conveyor containers by means of an unloading unit does not take place.

A second goods sink 3 shown on the right in FIG. 1 is connected to the endless conveyor 5, in particular to the first conveyor strand 7, by means of a discharge unit 12. The second goods sink 3 can be arranged at a spatial distance from the first conveyor strand 7, wherein a connection in terms of conveying technology to the first conveyor strand 7 is ensured by means of the discharge unit 12. The discharge unit 12 is in particular designed to be identical to the discharge line 11. The discharge unit 12 enables the targeted discharge of conveyor containers from the endless conveyor 5 into the discharge unit 12. In the region of the second goods sink 3, the conveyor containers are stopped by means of a stopper, which is not shown in more detail, and then unloaded, in particular manually. It is conceivable that the discharge unit 12 leads to a loading station analogously to the discharge line 11. It is also conceivable that the discharge unit 12 merges with the discharge line 11 or that the discharge unit 12 opens into the discharge line 11. In particular, a plurality of discharge units 12 can be connected to the endless conveyor. It is advantageous if either a discharge unit 12 or an unloading unit is provided for every second goods sink 3.

Figure 2:
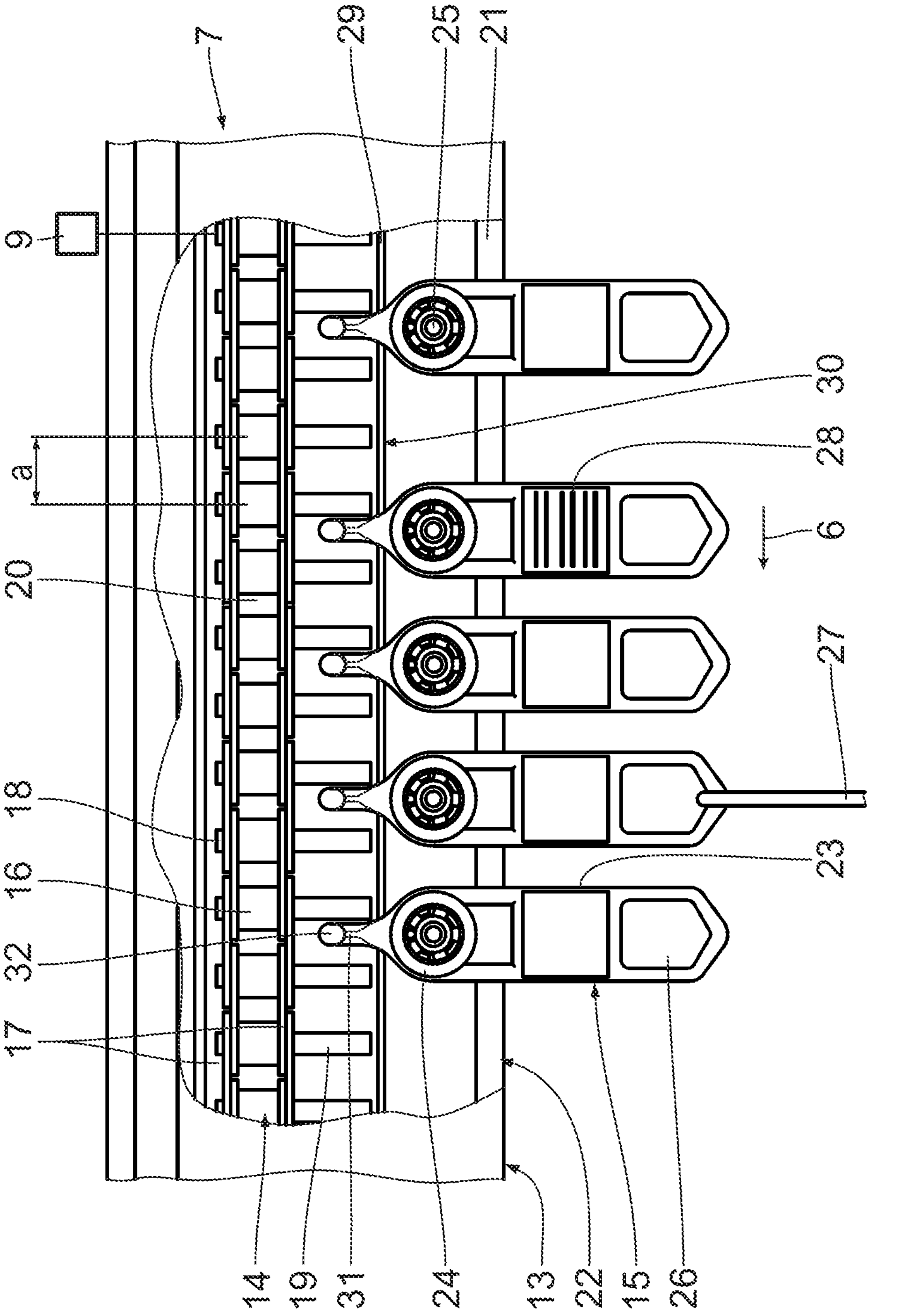
FIG. 2 shows an enlarged, partially cut-out side view of a first conveyor strand of an endless conveyor of the conveying apparatus according to FIG. 1 in the form of an overhead conveyor.

In the following, the first conveyor strand 7 is explained in more detail with reference to FIG. 2.

The first conveyor strand 7 is designed as a conveyor rail 13, which is also referred to as a transport rail. Accordingly, the conveying apparatus 1 is an overhead conveyor. The transport rail 13 can be moved in a room by means of suitable carrying devices. The transport rail 13 is designed as a hollow box profile in which a drive chain 14 is arranged and can be driven in the goods conveying direction 6 by means of the drive 9 that is shown purely schematically in FIG. 2.

Holding members 15 can be moved along the transport rail 13 by means of the drive chain 14. The drive chain 14 and the drive 9 form a conveyor drive means for the first conveyor strand 7. The drive 9 is in particular an electric motor drive which is mechanically coupled to the drive chain 14, i.e., for power transmission, by means of a power transmission member, in particular a drive gearwheel.

The drive chain 14 is a so-called roller chain with rollers 16, which are connected to each other at a small distance from one another by means of connection pieces 17. Bolts 18 have downwardly projecting bolt-shaped extensions serving as entrainers 19. The bolts 18 with the entrainers 19 extend normally to the transport rail 13 in a vertical plane that is spanned by the goods conveying direction 6.

The drive chain 14 is guided and held in the transport rail 13 in the direction of the bolts 18, i.e., perpendicularly and transversely to the goods conveying direction 6 by means of guides 20 engaging under the connection pieces 17.

A centre-to-centre distance a between adjacent entrainers 19 in the transport rail 13 in the goods conveying direction 6 corresponds exactly to the pitch of the drive chain 14 and is therefore invariable and constant. The entrainers 19 define the fixed conveyor container entrainment.

On an underside of the transport rail 13, two guiding webs 21 are formed facing each other, between which a slot 22 extending in the longitudinal direction of the transport rail 13, i.e., in the goods conveying direction 6, is formed or defined. A flat supporting part 23 of each holding member 15 projects downwards out of the transport rail 13 through said slot 22. In its upper region, the holding member 15 has a caster 24 on each side of the supporting part 23, each of which is supported on one of the two guiding webs 21 and can be displaced thereon in the goods conveying direction 6. There is therefore only one pair of casters 24 which can rotate around a common axis 25 so that the entire holding member 15 can oscillate about the axis 25 in the transport rail 13.

The supporting part 23 has a receiving opening 26 at its lower end into which a conveyor container in the form of a conveyor bag 27 can be suspended. The conveyor bag 27 is shown purely schematically in FIG. 2. The holding member 15, which is conveyed to roll in the transport rail 13 by means of the casters 24 and which is suitable for receiving the conveyor bag 27 by means of the receiving opening 26, is also referred to as a roller adapter.

The holding member 15 has an identification member 28 that is designed as a transponder, in particular an RFID chip, or as a machine-readable code, in particular a barcode or QR code. The identification member 28 is arranged in particular between the receiving opening 26 and the underside of the transport rail 13 and can thus be read by a reading device, in particular in an automated manner. The identification member 28 extends in accordance with the arrangement of the plate-like supporting part 23 in the goods conveying direction 6, i.e., its main surface lies open transversely to the goods conveying direction 6, i.e., towards the side.

After being mechanically coupled to the holding member 15, the conveyor bag 27 with goods to be conveyed remains attached to the holding member 15 during the entire conveying process, i.e., it is "married" to the latter. The goods to be conveyed are therefore controlled via the identification member 28 and thus the holding member 15. Since again the entire transport is performed from the drive chain, it is very important that a holding member assumes an absolutely unambiguous position relative to the drive chain 14 during transport.

The transport rail 13 has horizontal boundary webs 29 facing each other directly above the casters 24, which delimit a slot 30 in between. A stalk-like projection 31 of the holding member 15 extends through this slot 30 and is formed integrally with the supporting part 23 at the upper end thereof.

At the upper end of the stalk-like projection 31, a stop 32 is formed in the manner of a transverse bar, the extension of which horizontally transverse to the goods conveying direction 6 is greater than the width of the slot 30, so that when the holding member 15 is inclined relative to the transport rail 13, this stop 32 comes to rest on the boundary webs 29 and thus prevents further inclination of the holding member 15. The projection 31 and the stop 32 have the basic shape of a hammer, i.e., they are T-shaped.

The entrainers 19 of the drive chain 14 extend to immediately above the boundary webs 29, so that a holding member 15 located between two entrainers 19 is always reliably entrained, i.e., does not become disengaged from the entrainer 19.

The conveying apparatus 1 has a control unit 33 which is in signal connection in particular with the at least one goods source 2, the goods sinks 3, the endless conveyor 5 and/or the conveyor strands 7 and 8. The signal connection can be wired or wireless. In particular, the control unit 33 is in signal connection with the conveyor drive means 9 in order to enable a targeted introduction of the conveyor bags 27 from the at least one goods source 2 or a return of the conveyor bags 27 from the second conveyor strand 8.

The control unit 33 comprises in particular a machine control 38 and a logistic control system 39. The machine control 38 is designed in particular as a programmable logic controller (PLC). The logistic control system 39 is called warehouse control system (WCS).

The conveying apparatus 1 has a plurality of reading units 34, wherein at least one reading unit 34 is arranged in particular along the endless conveyor 5, in particular along the first conveyor strand 7. The reading units 34 serve to read the identification members 28. Since the conveyor bags 27 are conveyed along the first conveyor strand 7 with a fixed conveyor container entrainment, the respective position of a conveyor bag 27 within the endless conveyor 5 and in particular along the first conveyor strand 7 can be unambiguously determined from the identification data read by means of the reading units 34 and a determined rotational position of a rotary encoder that is mechanically coupled to the drive chain 14. For each conveyor bag 27, the exact position along the first conveyor strand 7 is known at all times and is unchangeably fixed. The reading units 34, together with the rotary encoder, enable a direct conclusion to be drawn about the respective position of the conveyor bags 27 within the endless conveyor 5, in particular along the first conveyor strand 7.

In particular, the control unit 33 is in signal connection with the unloading unit and/or with the discharge unit 12 in order to ensure automatic unloading and/or discharge of the conveyor bags 27.

A conveying method for goods in the conveying apparatus 1 is explained in more detail below in particular with reference to FIG. 3.

From the goods source 2, goods 37 are conveyed individually in conveyor bags 27 into the endless conveyor 5 and circulated there along the goods conveying direction 6. Three goods sinks 3, which are designed in particular as packing places, are directly connected to the endless conveyor 5. An unloading unit is arranged at each of the goods sinks 3, which enables automatic unloading of the conveyor containers, in particular autonomously by gravity. The goods sinks 3 are each identical in design and each have four goods discharge points 4. The goods sinks 3 are marked with the letters A, B and C for better differentiation for the explanation of the following method.

By means of the reading unit 34, which is arranged ahead of the endless conveyor 5 in the goods conveying direction 6, the conveyor containers 27 that are fed into the endless conveyor 5 are detected. This detection data is transmitted to the central control unit 33.

A list of orders to be processed is stored in the control unit 33. This list represents a demand for orders. Each order comprises at least one product 37, which is also referred to as ordered product 37.

In the control unit 33, the demand for orders to be processed is compared with the goods 37 that are available in the endless conveyor 5. The goods 37 that are present in the endless conveyor 5 are allocated to the orders to be processed. This allocation takes place in particular in advance in a logistic process. Each ordered product 37 that is fed from the at least one goods source 2 into the endless conveyor 5 is already allocated to an order at this point in time. In particular, the handling and conveyance of the ordered goods 37 is order-oriented. The handling of the ordered goods and their conveyance is carried out in orders.

In particular, the ordered goods 37 from the goods source 2 are fed into the endless conveyor 5 in an unsorted and, in particular, quasi-random manner. Quasi random means that in particular the order and/or the staging time of the ordered goods 37, which are transferred from the goods source 2 to the endless conveyor 5 at a certain moment, is not fixed and in particular is predetermined by the goods source 2 itself. The extent of randomness is determined in particular by the number of ordered goods 37 requested at the same time, wherein this number corresponds at most to the storage capacity of the endless conveyor 5. The extent of randomness can additionally or alternatively also be determined by the temporal characteristics of the goods source 2, in particular a circulation time in the goods source 2, if the goods source 2 is designed as a revolving goods storage unit.

Figure 3:
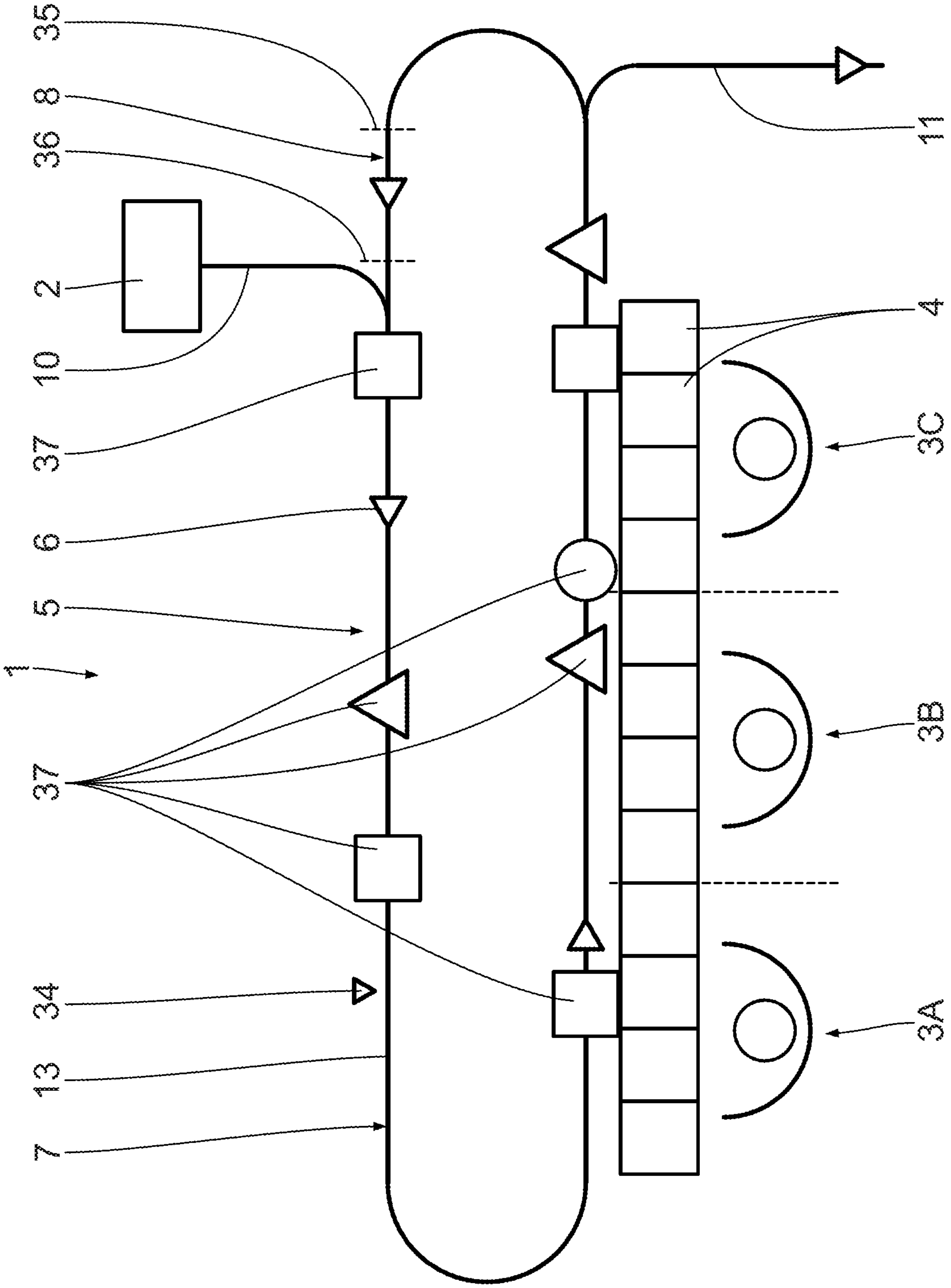
FIG. 3 shows an illustration corresponding to FIG. 1 to explain an automated evaluation of complete orders in the endless conveyor.

In FIG. 3, the goods 37 that are allocated to one and the same order are marked with identical symbols.

For the optimized allocation of complete orders to the various goods sinks 3A, 3B, 3C, the orders are automatically evaluated with regard to their suitability.

One possible evaluation criterion is the staging time for the ordered goods to one of the goods sinks 3A, 3B, 3C. For this purpose, the distance of all ordered goods to the respective goods sinks is determined at a certain point in time, wherein the goods 37 furthest away from a goods sink 3A, 3B, 3C are decisive for each complete order. A complete order can only be processed at a goods sink when the last goods have also arrived at the goods sink. The smaller the distance between the ordered goods furthest away from the respective goods sink, the higher the evaluation of a complete order in the endless conveyor 5. The higher the suitability number, the better the suitability.

If the suitability number is 0, this means that the respective order is unsuitable for the respective goods sink. This is the case, for example, if an ordered product cannot be delivered to the particular goods sink due to its characteristics, in particular its weight or size. It is also conceivable that an order must be allocated to a particular goods sink due to set-up criteria, in particular due to customer allocation. In the embodiment example shown, goods sink 3A is unsuitable for triangular ordered goods 37, goods sink 3B is unsuitable for square ordered goods 37 and goods sink 3C is unsuitable for square and circular ordered goods 37.

The evaluation results of the complete orders can be advantageously and clearly presented in a so-called transport matrix according to Table 1.

TABLE 1

Transport matrix according to FIG. 3

| Order | Goods sink 3A | 3B | 3C |
|---|---|---|---|
| ○ | 2 | 1 | 0 |
| □ | 3 | 0 | 0 |
| Δ | 0 | 2 | 1 |

In principle, it is possible to allocate the complete orders to goods sinks 3A, 3B, 3C on the basis of the transport matrix. In this case, the □ order would be allocated to goods sink 3A, as this is the only suitable order for this goods sink. Accordingly, the ○ order is allocated to goods sink 3B, although the order would be more suitable for goods sink 3A than for allocation to goods sink 3B due to the staging time. Thus, when allocating all open orders to all open goods sinks 3A, 3B, 3C, an overall optimum can be found for all possible order-to-goods sink pairings.

With the same explanation, the A-order is allocated to goods sink 3C and processed there, even if the A-order for goods sink 3B would theoretically have a better individual suitability. Considering the overall optimum, i.e., for the overall suitability, the allocation of the A-order for goods sink 3B is better.

The allocation of the complete orders to the different goods sinks is carried out such that the average maximum distance of the ordered goods to the goods sinks is minimized. This means that the total evaluation of all allocations is optimized in order to minimize the staging time in particular. Calculations by the applicant have shown that the average staging time for the complete orders and thus in particular the number of goods sinks that are required to process a given order volume can be reduced by at least 10%.

In particular, the algorithm determines the overall optimum in such a manner that the total of the suitabilities for allocated orders is at a maximum.

The evaluation, in particular on the basis of the distance of the ordered goods to the goods sinks, is repeated in particular on a regular basis and in particular cyclically, for example with a cycle time of 1 s. The evaluation process is dynamic. When an order has been allocated to a goods sink, this order disappears from the evaluation matrix. If new goods are available in the endless conveyor and have been allocated to a complete order, new order lines are generated in the evaluation matrix. If goods sinks are occupied with an order, they can temporarily drop out of the evaluation matrix.

For the evaluation matrix, other evaluation criteria can be taken into account in addition or as an alternative to the distance of the ordered goods to a goods sink. The evaluation criteria can be characteristics of the order itself and/or characteristics of the packing place, i.e., the respective goods sink. These can be situational characteristics with regard to the order and/or the packing place, such as the compatibility of the order with regard to the packing place, the position of the ordered goods in the endless conveyor 5 and/or the age of the ordered goods in the endless conveyor 5. Characteristics of the goods sinks are, for example, the priority of a discharge compartment 4 within a goods sink 3 and/or a filling level of the discharge compartments 4. Inherent characteristics with respect to the order are, for example, its priority or its cut-off time. The cut-off time is understood in particular to mean the latest possible processing time of an order. This term is particularly common in the field of e-commerce. The cut-off time is defined in particular by a pick-up date for packed orders from the outgoing goods zone, i.e., in particular a pick-up by transport service providers such as Deutsche Post, DHL, Hermes, etc. The relevant orders must be processed before the pick-up date. The cut-off time can vary, in particular depending on the sender, the priority of the customer and/or the selected shipping method, in particular express shipments.

Inherent characteristics for order and packing place are the so-called set-up criteria. Setup criteria are, for example, the priority of an order and/or individual ordered goods, an age of the order, in particular its number of cycles in the endless conveyor 5, the sender, i.e., transport service provider, the order size, in particular so-called single-order, multi-order and/or large orders, a safety level such as, for example, particularly high-value goods, a hazard level such as, for example, hazardous substances, an order type such as, for example, e-commerce or retail, and/or a packaging type such as, for example, cardboard box, bag and various packaging sizes.

Based on the transport matrix in Table 1, the other criteria are considered as explained above. For each criterion, an individual suitability is determined for each order. These individual suitabilities are multiplied to an overall suitability. The evaluation matrix which represents the overall suitability is given in Table 2.

TABLE 2

Evaluation matrix

| Order | Goods sink 3A | 3B | 3C |
|---|---|---|---|
| ○ | 0.4 | 0.2 | 0 |
| □ | 0.8 | 0 | 0 |
| Δ | 0 | 0.5 | 0.3 |

In particular, all values in the evaluation matrix are standardized, especially such that the highest evaluation value is set to 1 and all further evaluation values are standardized accordingly. In the evaluation matrix, all fields have a value between 0 and 1. In the example shown, the allocation of the orders to the goods sinks is not changed by the evaluation matrix according to Table 2 compared to the transport matrix in Table 1. Nevertheless, it is conceivable that a change in the allocation can occur due to the consideration and the individual suitabilities.

The evaluation matrix can be transformed into a so-called cost matrix. For the transformation, a fictitious constant C is used for the following calculation rule:

$$K_{ij}=C-C\cdot B_{ij}$$

In this case, $K_{ij}$ is the value in the cost matrix in row i and column j. Accordingly, is the value in the evaluation matrix in row i and column j. According to the calculation rule, the maximum suitability of 1 results in minimum costs of 0. In the special case that there is no suitability, i.e., $B_{ij}=0$, correspondingly, the maximum costs arise according to the fictitious constant C. In this case, the order is not allocated to this goods sink.

Table 3 summarizes the cost matrix that is generated from the evaluation matrix by transformation with the constant C=10.

TABLE 3

Cost matrix

| Order | Goods sink 3A | 3B | 3C |
|---|---|---|---|
| ○ | 6 | 8 | 10 |
| □ | 2 | 10 | 10 |
| Δ | 10 | 5 | 7 |

For the cost matrix, an optimum, in particular the global optimum, is sought with regard to the minimum costs. This can be done particularly advantageously with the so-called Hungarian method, i.e., on the basis of the Kuhn-Munkres algorithm. It has been found that the application of the Kuhn-Munkres algorithm is particularly advantageous for an efficient and optimized solution of the cost matrix.

Other algorithms and/or heuristics are possible if they have a sufficiently high degree of optimization and approach the global optimum of minimum cost in any case. Such an algorithm is considered suitable if it corresponds to the global optimum by at least 80%, in particular by at least 85% and in particular by 90%. Such algorithms can work comparatively fast and efficiently. The Vogel approximation method, the MODI method, which is also known as the modified distribution method, the matrix minimum method and the Stepping Stone method can be mentioned as examples.

In particular, the transformation from the evaluation matrix to the cost matrix can also be omitted if, starting from the evaluation matrix, an algorithm is chosen to maximize the total sum of suitabilities, i.e., the evaluation values.

What is claimed is:

1. A conveying method for goods, the method comprising:
- conveying goods for multiple orders in an endless conveyor along a goods conveying direction;
- detecting the goods conveyed;
- forming a list of complete orders on the basis of the goods conveyed;
- defining ordered goods as goods included in at least one of the complete orders;
- evaluating complete orders with regard to their suitability for allocation to one goods sink of multiple goods sinks, the evaluating including accounting for at least one characteristic of at least one good of the ordered goods and of the goods sinks, wherein the goods sinks are coupled to the endless conveyor, wherein the at least one characteristic is a respective distance of the at least one good from the goods sinks which is oriented in the goods conveying direction;
- allocating a complete order to one of the goods sinks on the basis of the evaluation; and
- conveying the allocated ordered goods to the goods sink.

2. The conveying method according to claim 1, wherein the evaluating includes providing a higher evaluation of a complete order based on a smaller distance of the ordered goods that are furthest away from the respective goods sink.

3. The conveying method according to claim 1, further comprising executing the method as an automated method.

4. The conveying method according to claim 3, wherein the executing includes using at least one of a machine control system for the endless conveyor and a logistic control system for a position definition of the goods sinks.

5. The conveying method according to claim 1, further including delivering the ordered goods to the goods sinks.

6. The conveying method according to claim 5, further including delivering ordered goods to the goods sinks by unloading the ordered goods from conveyor containers and by discharging the conveyor containers that convey the ordered goods at the assigned goods sink.

7. The conveying method according to claim 6, wherein the unloading is carried out automatically.

8. The conveying method according to claim 1, wherein the at least one characteristic is at least one of availability of the goods sinks, prioritization of goods sinks, compatibility of the ordered goods with the goods sinks, prioritization of orders, a setup criterion, reduction of unprocessed orders in the endless conveyor, and reduction of unused ordered goods in the endless conveyor.

9. The conveying method according to claim 8, wherein the at least one characteristic is the prioritization of discharge compartments of a goods sink.

10. The conveying method according to claim 8, wherein the at least one characteristic is the prioritization of ordered goods within orders.

11. The conveying method according to claim 1, further comprising determining the positions of the ordered goods.

12. The conveying method according to claim 11, wherein the determining is a repeated determining.

13. The conveying method according to claim 11, wherein the determining is a cyclic determining.

14. The conveying method according to claim 11, further comprising transmitting the positions of the ordered goods to a logistic control system.

15. The conveying method according to claim 11, wherein the determining includes consideration of a relative conveying position of a conveying drive from a fixed entrainment position of an entrainer that is conveyed by the conveying drive.

16. The conveying method according to claim 15, wherein the determining includes determining a relative conveying position of the conveying drive with a sensor.

17. The conveying method according to claim 15, wherein the fixed entrainment position is determined when the ordered product is introduced into the endless conveyor.

18. The conveying method according to claim 15, wherein the fixed entrainment position is determined via a reading unit cooperable with a signal transmitter that is at least one of attached to and integrated with the entrainer.

19. A conveying method for goods, the method comprising:
- conveying good for multiple orders in an endless conveyor along a good conveying direction;
- detecting the goods conveyed;
- forming a list of complete orders on the basis of the goods conveyed;
- evaluating complete orders with regard to their suitability for allocation to one goods sink of multiple goods sinks, the evaluating including accounting for at least one characteristic of at least one good of the ordered goods and of the goods sinks, wherein the goods sinks are coupled to the endless conveyor, wherein evaluating includes evaluating orders on the basis of a transport matrix, wherein the transport matrix comprises columns and rows;
- allocating a complete order to one of the goods sinks on the basis of the evaluation; and
- conveying the allocated ordered goods to the goods sink.

20. The conveying method according to claim 19, wherein the rows symbolize different orders and the columns symbolize different goods sinks.

21. The conveying method according to claim 19, further comprising, if an order is unsuitable for a respective good sink, assigning a separate identification number to the order.

22. The conveying method according to claim 19, further comprising assigning a numerical value to each order during the evaluating.

23. The conveying method according to claim 22, wherein the numerical value is one of ordinally and metrically scaled.

24. The conveying method according to claim 19, further comprising transforming the transport matrix into a cost matrix.

25. The conveying method according to claim 24, wherein the transforming of the transport matrix into a cost matrix takes place by at least one of multiplying individual evaluations of each order and multiplying individual costs and applying a Kuhn-Munkres algorithm.

26. A conveying apparatus for goods of multiple orders, the apparatus comprising:
- a closed endless conveyor on which goods are conveyed in circulation;
- a plurality of goods sinks coupled to the endless conveyor for conveying ordered goods; and
- a control unit configured to carry out the conveying via a conveying method for goods, in which the method includes
  - conveying goods for multiple orders in an endless conveyor along a goods conveying direction;

detecting the goods conveyed;

forming a list of complete orders on the basis of the goods conveyed;

defining ordered goods as goods included in at least one of the complete orders;

evaluating complete orders with regard to their suitability for allocation to one goods sink of multiple goods sinks, the evaluating including accounting for at least one characteristic of at least one good of the ordered goods and of the goods sinks, wherein the goods sinks are coupled to the endless conveyor, wherein the at least one characteristic is a respective distance of the at least one good from the goods sinks which is oriented in the goods conveying direction;

allocating a complete order to one of the goods sinks on the basis of the evaluation; and conveying the allocated ordered goods to the goods sink.

27. The conveying apparatus according to claim 26, wherein the endless conveyor has a second conveyor strand without fixed conveyor container entrainment, wherein the second conveyor strand together with the first conveyor strand forms the closed endless conveyor.

28. The conveying apparatus according to claim 26, further comprising at least one source of goods to provide goods in the conveyor containers.

29. The conveying apparatus according to claim 26, wherein the endless conveyor has a first conveyor strand with a fixed conveyor container entrainment, wherein at least one of the first conveyor strand is connected to the goods sinks of the plurality of goods sinks and wherein the first conveyor strand has a conveyor drive for the fixed conveyor container entrainment.

30. The conveying apparatus according to claim 29, wherein the first conveyor strand is directly coupled to the goods sinks of the plurality of goods sinks.

31. The conveying apparatus according to claim 29, wherein the conveyor drive is a drive chain operable in a conveyor rail and cooperative entrainers couplable in each case to a conveyor container.

* * * * *